United States Patent
Akabane et al.

(10) Patent No.: US 9,964,714 B2
(45) Date of Patent: May 8, 2018

(54) OPTICAL CONNECTOR

(71) Applicant: FUJITSU COMPONENT LIMITED, Tokyo (JP)

(72) Inventors: Ayumu Akabane, Tokyo (JP); Satoshi Moriyama, Tokyo (JP); Mitsuki Kanda, Tokyo (JP); Shinichiro Akieda, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days. days.

(21) Appl. No.: 15/450,156

(22) Filed: Mar. 6, 2017

(65) Prior Publication Data
US 2017/0176695 A1 Jun. 22, 2017

Related U.S. Application Data

(63) Continuation of application No. 15/055,757, filed on Feb. 29, 2016, now Pat. No. 9,625,663.

(30) Foreign Application Priority Data

Mar. 6, 2015 (JP) .................. 2015-045079

(51) Int. Cl.
*G02B 6/38* (2006.01)
*G02B 6/42* (2006.01)

(52) U.S. Cl.
CPC ......... *G02B 6/3887* (2013.01); *G02B 6/3829* (2013.01); *G02B 6/3882* (2013.01); *G02B 6/428* (2013.01); *G02B 6/4292* (2013.01)

(58) Field of Classification Search
CPC .... G02B 6/3887; G02B 6/3829; G02B 6/428; G02B 6/3882; G02B 6/4292
See application file for complete search history.

(56) References Cited

U.S. PATENT DOCUMENTS

| | | | |
|---|---|---|---|
| 7,616,852 B2 | 11/2009 | Ohtsu et al. | |
| 7,665,911 B2 * | 2/2010 | Hamazaki | G02B 6/421 385/14 |
| 8,113,723 B2 | 2/2012 | Togami et al. | |
| 2004/0120656 A1 * | 6/2004 | Banas | G02B 6/3887 385/86 |
| 2008/0037934 A1 | 2/2008 | Daikuhara et al. | |
| 2015/0331208 A1 | 11/2015 | Moriyama et al. | |

FOREIGN PATENT DOCUMENTS

| | | |
|---|---|---|
| JP | 2005-049816 | 2/2005 |
| JP | 2006-154553 | 6/2006 |
| JP | 2008-281694 | 11/2008 |
| JP | 2015-022129 | 2/2015 |

* cited by examiner

*Primary Examiner* — Ryan Lepisto
(74) *Attorney, Agent, or Firm* — IPUSA, PLLC (57) ABSTRACT

An optical connector includes a board including an element that performs conversion between an electric signal and light, a first ferrule and a second ferrule that are butted against each other, an optical waveguide that optically connects the first ferrule with the element, and a guide that guides the optical waveguide disposed between the first ferrule and the element.

7 Claims, 12 Drawing Sheets

OPTICAL CONNECTOR

CROSS-REFERENCE TO RELATED APPLICATION

The present application is a continuation application of U.S. patent application Ser. No. 15/055,757 filed on Feb. 29, 2016 and is based upon and claims the benefit of priority of Japanese Patent Application No. 2015-045079 filed on Mar. 6, 2015, the entire contents of which are incorporated herein by reference.

BACKGROUND OF THE INVENTION

1. Field of the Invention

An aspect of this disclosure relates to an optical connector.

2. Description of the Related Art

With the increase in the capacity of optical communications, there is a demand for high-density, smaller optical connectors.

An optical connector conforming to QSFP (Quad Small Form-factor Pluggable) standards (QSFP connector) includes a board on which electronic components are mounted, an MT (Mechanically Transferrable) ferrule to which an optical fiber is connected, and a lens ferrule optically connected to the MT ferrule.

For a QSFP connector, the dimensions of a housing and the position of a contact to be connected to an external device are strictly defined. Therefore, the layout of components of a QSFP connector cannot be freely determined.

Also, because the housing dimensions are predefined, the positions of an optical fiber and ferrules in the housing are naturally determined.

See, for example, Japanese Laid-Open Patent Publication No. 2005-049816, Japanese Laid-Open Patent Publication No. 2008-281694, Japanese Laid-Open Patent Publication No. 2006-154553, and Japanese Laid-Open Patent Publication No. 2015-022129.

An optical waveguide can be bent as needed, but if bent and/or twisted at a small radius of curvature, propagation of light may be affected and the optical transmission efficiency may be reduced.

SUMMARY OF THE INVENTION

In an aspect of this disclosure, there is provided an optical connector that includes a board including an element that performs conversion between an electric signal and light, a first ferrule and a second ferrule that are butted against each other, an optical waveguide that optically connects the first ferrule with the element, and a guide that guides the optical waveguide disposed between the first ferrule and the element.

DESCRIPTION OF EMBODIMENTS

Embodiments of the present invention are described below with reference to the accompanying drawings.

Throughout the accompanying drawings, the same or corresponding reference numbers are assigned to the same or corresponding components, and repeated descriptions of those components are omitted.

The embodiments described below are examples, and the present invention is not limited to those embodiments. Also, not all of the features and their combinations described in the embodiments may be essential to the present invention.

In the drawings, directions are indicated by arrows X1, X2, Y1, Y2, Z1, and Z2. In the descriptions below, an X1 side may be referred to as a "module side", an X2 side may be referred to as a "cable side", and an X1/X2 direction may be referred to as a "longitudinal direction". A Y1/Y2 direction that is orthogonal to the longitudinal direction on a plane of a board 8 may be referred to as a "width direction". Further, a Z1/Z2 direction that is orthogonal to the longitudinal direction and the width direction may be referred to as a "height direction" or "vertical direction".

Figure 1:
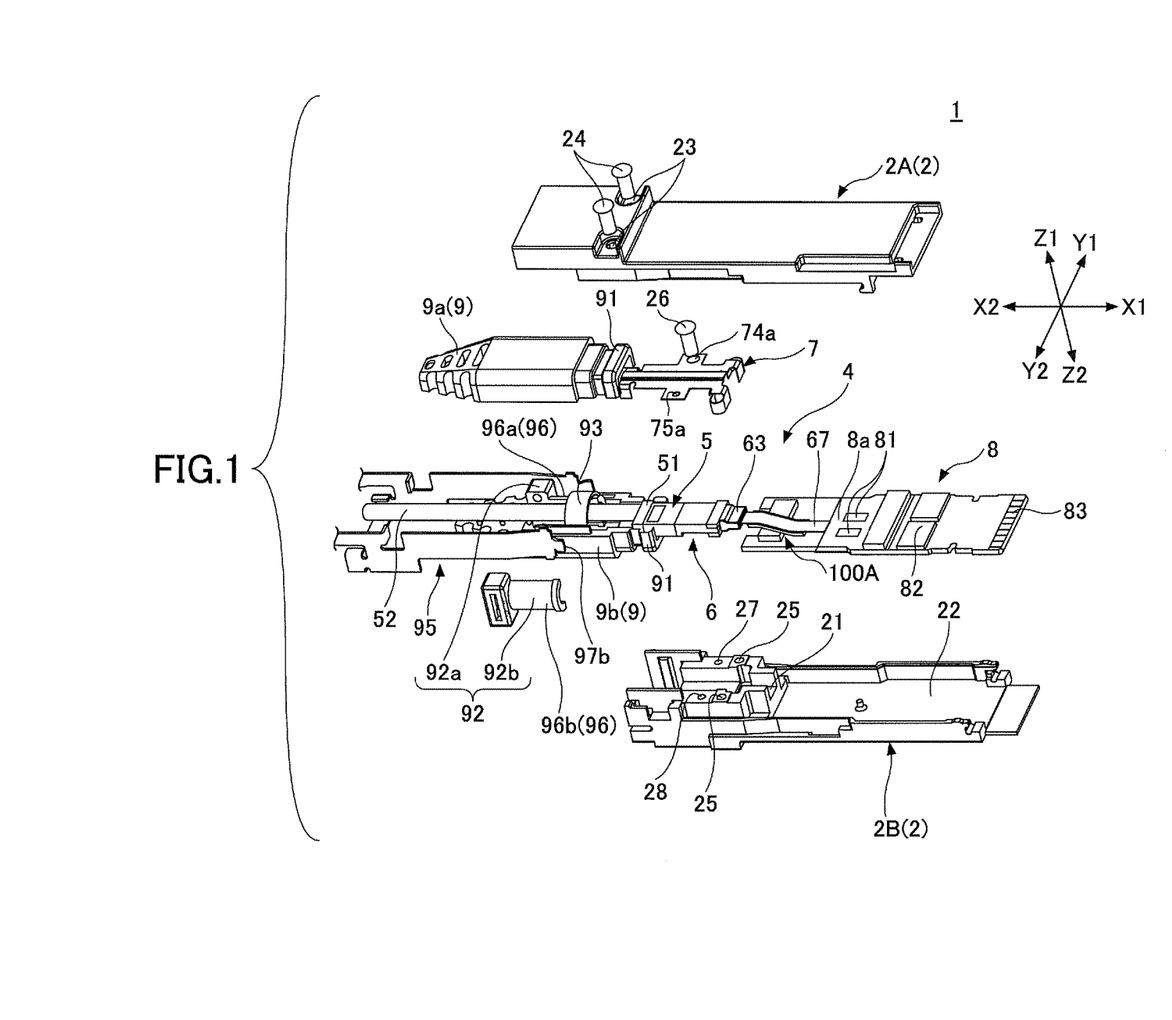
FIG. 1 is an exploded perspective view of an optical connector according to a first embodiment.

FIG. 1 is an exploded perspective view of an optical connector 1 (hereinafter referred to as "connector") according to a first embodiment. The connector 1 is a high-density optical connector conforming to the QSFP standards. The connector 1 includes a housing 2, an optical module 4, a board 8, an optical cable 52, and a mirror-equipped optical waveguide 67 (hereinafter referred to as "waveguide").

For example, the connector 1 may be used for Ethernet (registered trademark), and may be inserted into a module of a computer system (hereafter referred to as a "computer-side module") such as a mainframe system. In FIG. 1, the X1 direction corresponds to the direction in which the optical connector 1 is inserted into the computer-side module.

The housing 2 includes an upper housing 2A and a lower housing 2B. Insertion holes 23 into which screws are inserted are formed in the upper housing 2A. Screw holes 25 into which the screws 24 are screwed are formed in the lower housing 2B. The screws 24 are inserted into the insertion holes 23 and screwed into the screw holes 25 to join the upper housing 2A and the lower housing 2B and form the housing 2.

The optical module 4, the board 8, and a cable boot 9 are disposed in the housing 2.

The optical module 4 includes an MT (Mechanically Transferable) ferrule 5, a lens ferrule 6, and a clip 7.

The MT ferrule 5 is connected to a multicore optical cable 52 including multiple optical fibers. An abutting surface to be butted against the lens ferrule 6 is formed at a module-side end of the MT ferrule 5, and guide pin insertion holes are formed in the abutting surface. Guide pins GP of the lens ferrule 6 are inserted into the insertion holes to align the MT ferrule 5 and the lens ferrule 6 with each other.

The lens ferrule 6 is formed of a transparent resin such as polybutylene succinate (PBS). The waveguide 67 is connected to the lens ferrule 6. The lens ferrule 6 includes an abutting surface to be butted against the MT ferrule 5, and the guide pins GP are formed on the abutting surface.

The optical cable 52 and the waveguide 67 are optically connected to each other by butting the MT ferrule 5 and the lens ferrule 6.

The clip 7 is a monolithic component formed of a spring material. The clip 7 is attached to pinch the MT ferrule 5 and the lens ferrule 6. The MT ferrule 5 and the lens ferrule 6 are butted against each other by the elastic force of the clip 7 engaging with and attached to the MT ferrule 5 and the lens ferrule 6.

The board 8 is a printed circuit board, and includes optical elements 81, electronic components 82, and a contact 83.

The optical elements 81 convert light into electricity and vice versa. The optical elements 81 are electrically connected to the contact 83 via wiring formed on the board 8 and the electronic components 82. The optical elements 81 are also optically connected to the waveguide 67.

In FIG. 1, two optical elements 81 are mounted on the board 8. One of the two optical elements 81 converts an optical signal received via the optical cable 52 into an electric signal and another one of the two optical elements 81 converts an electric signal received via the contact 83 into an optical signal. However, the number of optical elements 81 mounted on the board 8 and functions of the optical elements 81 are not limited to this example.

The electronic components 82 drive a light-emitting element and a light-receiving element of the optical elements 81, and perform signal processing on transmission and reception signals. The contact 83 is an edge connector. The connector 1 is attached to the computer-side module by connecting the contact 83 to a connector of the computer-side module.

The cable boot 9 prevents the optical cable 52 from being pulled out of the MT ferrule 5. The cable boot 9 is formed by joining two boot half parts 9a and 9b that sandwich the optical cable 52. The optical cable 52 is disposed to pass through the cable boot 9.

A lock 91 is formed at a module-side end of the cable boot 9. The lock 91 is fixed to the housing 2. With the lock 91 fixed to the housing 2, the cable boot 9 is prevented from moving in the longitudinal direction relative to the housing 2, i.e., in a direction in which the connector 1 is inserted into or pulled out of the computer-side module.

A sleeve 92 and a crimp ring 93 are disposed in the cable boot 9. The optical cable 52 passes through the sleeve 92.

The sleeve 92 is comprised of sleeve half parts 92a and 92b where tubular half parts 96a and 96b are formed. The half parts 96a and 96b form a tubular part 96. When the sleeve half part 92a and the sleeve half part 92b are joined to each other, the optical cable 52 is sandwiched between the half parts 96a and 96b. The diameter of an insertion hole formed inside of the tubular part 96 is slightly less than the diameter of the optical cable 52.

The crimp ring 93 is put around the tubular part 96. When the sleeve 92 is attached to the optical cable 52 and the crimp ring 93 is attached to crimp the tubular part 96, the optical cable 52 is fixed to the sleeve 92, and the optical cable 52 and the sleeve 92 form an integral structure. Further, the sleeve 92 engages with the cable boot 9. This configuration can prevent the optical cable 52 from being detached from the optical module 4 even when the optical cable 52 is pulled.

A pull tab 95 is used to pull out the connector 1 from an electronic apparatus.

The optical module 4, the board 8, and the cable boot 9 are attached to the housing 2. The lower housing 2B includes a module attaching part 21 to which the optical module 4 is attached, and a board attaching part 22 to which the board 8 is attached.

To attach the optical module 4 to the housing 2, the optical module 4 is inserted together with the cable boot 9 into the module attaching part 21. When the optical module 4 is inserted into the lower housing 2B, an insertion hole 74a of the clip 7 faces a screw hole 27, and a boss 28 of the lower housing 2B is inserted into a hole 75a of the clip 7.

The optical module 4 is fixed to the lower housing 2b by inserting a screw 26 into the insertion hole 74a and screwing into the screw hole 27, and fusing the boss 28. The board 8 is bonded with an adhesive to the board attaching part 22.

After the optical module 4 and the board 8 are attached to the lower housing 2B, the upper housing 2A is placed on the lower housing 2B, and the screws 24 are inserted into the insertion holes 23 and screwed into the screw holes 25 to assemble the connector 1.

Figure 2:
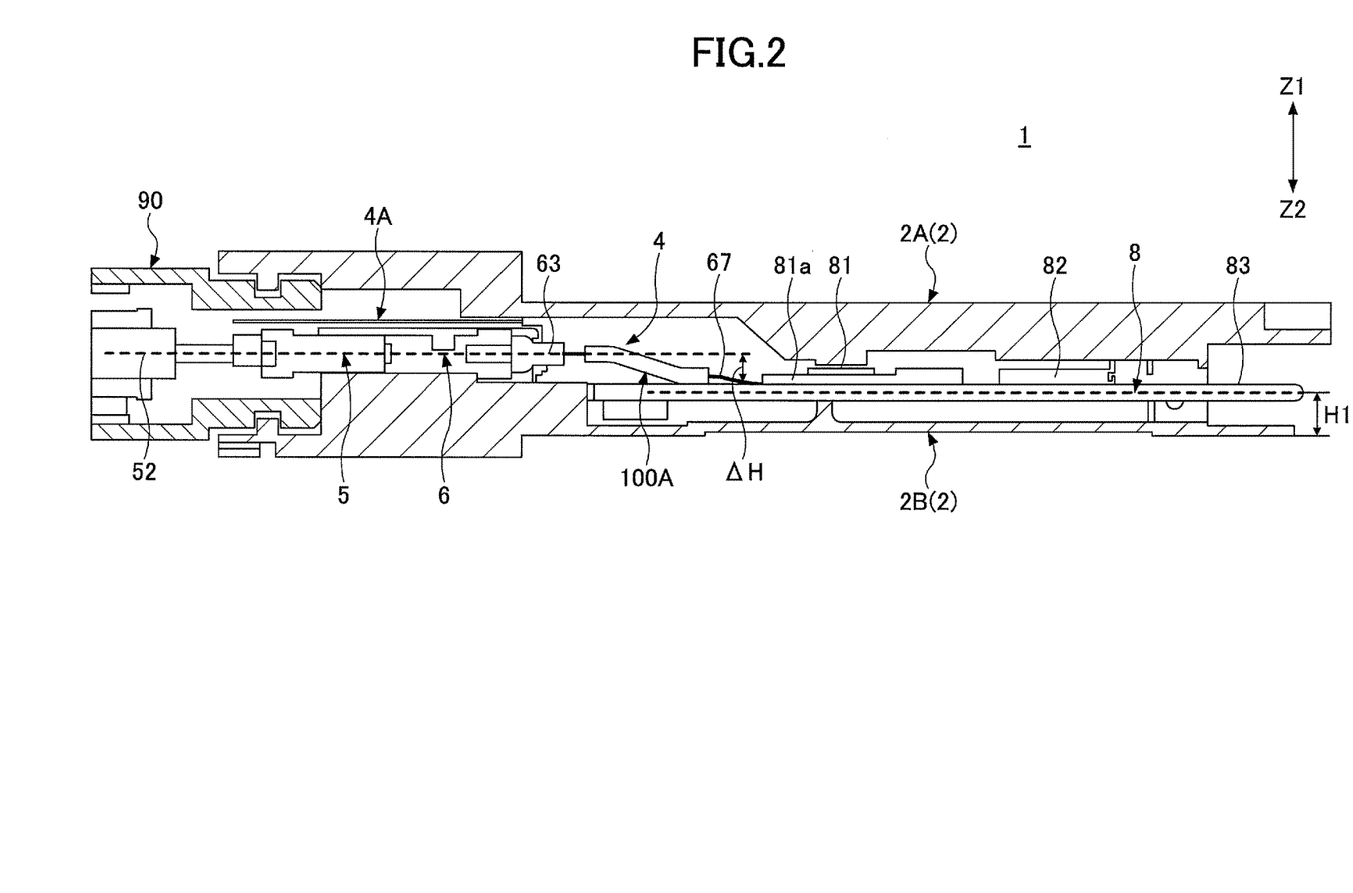
FIG. 2 is a cut-away side view of an optical connector according to the first embodiment.

FIG. 2 is a cut-away side view of the connector 1. As the connector 1 conforms to the QSFP standards, the dimensions of the housing 2 and the position of the contact 83 are strictly defined.

A height H1 of the contact 83 from the bottom surface of the housing 2 is set at 2.25 mm. A height H2 of the module side of the housing 2 is set at 8.5 mm. Accordingly, the contact 83 is positioned at a height that is offset in the downward (Z2) direction from the center of the housing 2.

On the other hand, taking into account the position at which the optical cable 52 is drawn out, the optical module 4 is positioned at a height that is higher than the height of the board 8 from the bottom surface of the housing 2. For this reason, a step is formed between the optical module 4 and the board 8. In FIG. 2, ΔH indicates the height of the step formed between the optical module 4 and the board 8.

In the present embodiment, the waveguide 67 is used to connect the optical module 4 and the board 8. The waveguide 67 includes a film sheet 67a formed of a polymer such as polyimide, and multiple optical waveguide cores 67b for transmitting light arranged parallel to each other in the width direction on the film sheet 67a. The waveguide 67 also includes a mirror 67c that is disposed at a position corresponding to the optical elements 81.

In the present embodiment, a vertical cavity surface emitting laser (VCSEL) is used as one of the optical elements 81. The VCSEL is a semiconductor laser that emits a laser beam in a direction that is perpendicular to the board 8. Accordingly, the VCSEL emits light in the vertical direction. Also in the present embodiment, a photo detector (PD), which converts an input light signal into an electric signal, is used as another one of the optical elements 81.

An optical element mounting substrate 8a is provided on the board 8. The optical elements 81 are surface-mounted on the substrate 8a. A module-side end of the waveguide 67 is sandwiched between the substrate 8a and the board 8.

Figure 13:
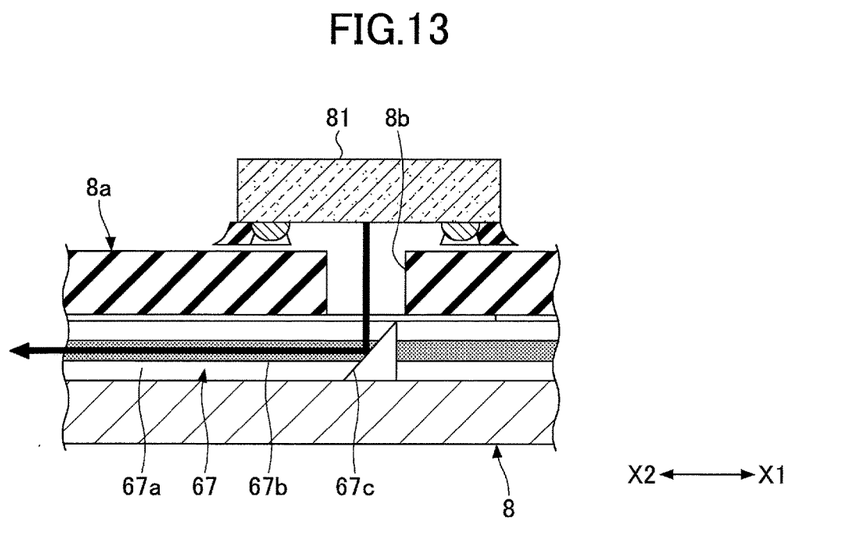
FIG. 13 is a cut-away side view of a waveguide.

As indicated by an arrow in FIG. 13, light emitted from the VCSEL travels downward, passes through a through hole 8b formed in the substrate 8a, and reaches the waveguide 67. The mirror 67c is disposed to face the optical elements 81, and has a reflecting surface that is inclined at 45 degrees with respect to the vertical direction.

The light from the VCSEL is deflected by 90 degrees by the mirror 67c, and travels in the waveguide cores 67b toward the cable side in the X2 direction. On the other hand, light traveled in the waveguide cores 67b toward the module side in the X1 direction is deflected upward by the mirror 67c, passes through the through hole 8b, and enters the PD.

Because the optical elements 81 emit and receive light in the vertical direction, the height of the optical elements 81 on the board 8 can be made relatively small.

With the combination of the optical elements 81 and the waveguide 67 including the mirror 67c, the waveguide 67 can be disposed to face the board 8, and the total thickness of the board 8 and the optical waveguide 67 can be reduced.

Also, it is possible to flexibly change the positions for mounting the optical elements 81 by adjusting the length of the waveguide 67. For example, the optical elements 81 can be mounted on the module side of the board 8. This in turn makes it possible to photoelectrically convert an electric signal at an earlier timing at the module side of the board 8, and the transmission loss of the electric signal can be reduced.

As described above, the waveguide 67 bridges the step between the optical module 4 and the board 8, and therefore needs to have flexibility.

The waveguide 67 can be bent as needed. However, when the waveguide 67 is bent and/or twisted at a small radius of curvature, its optical transmission efficiency may be reduced. The optical waveguide 67 is liable to be bent at a position near a ferrule boot 63 from which the waveguide 67 extends.

Figure 3A:
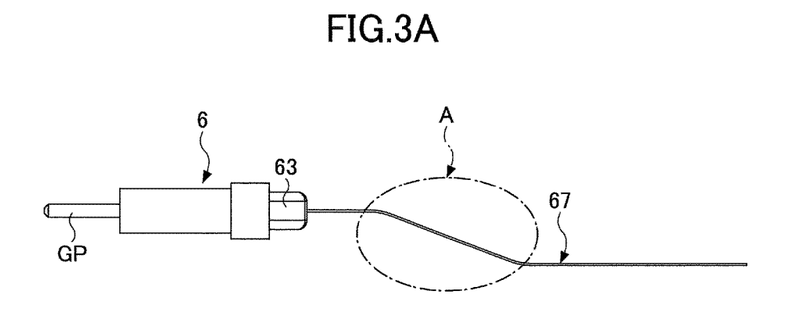
FIGS. 3A and 3B are drawings illustrating bent shapes of a waveguide.
Figure 3B:
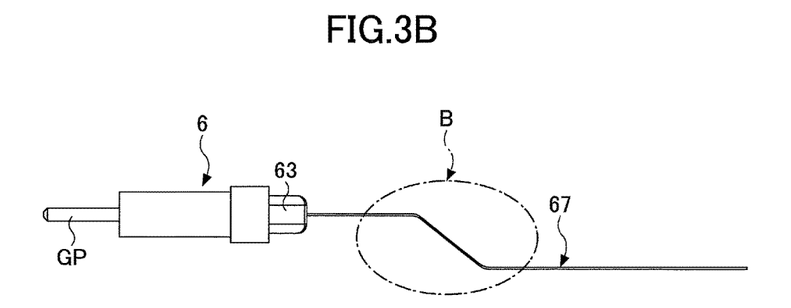

FIGS. 3A and 3B are drawings illustrating exemplary bent shapes of the waveguide 67 extending from the ferrule boot 63. FIG. 3A illustrates an example where the waveguide 67 is bent smoothly. When the waveguide 67 is bent smoothly, the optical transmission efficiency of the waveguide 67 is not reduced.

FIG. 3B illustrates an example where the waveguide 67 is bent sharply, and a bend with a small radius of curvature is formed. When the waveguide 67 is bent sharply, the optical transmission efficiency of the waveguide 67 is reduced.

As illustrated in FIG. 1, the connector 1 includes an optical waveguide guide 100A (hereinafter referred to as "guide") that guides the waveguide 67 in a section between the lens ferrule 6 and the optical elements 81.

Figure 4A:
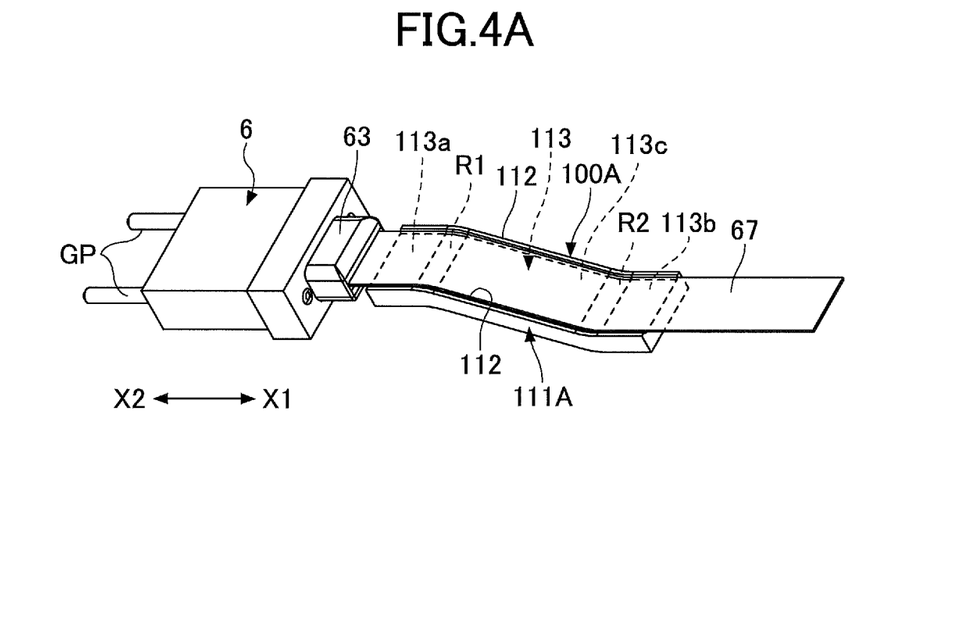
FIG. 4A is a perspective view of a lens ferrule and a guide according to the first embodiment.
Figure 4B:
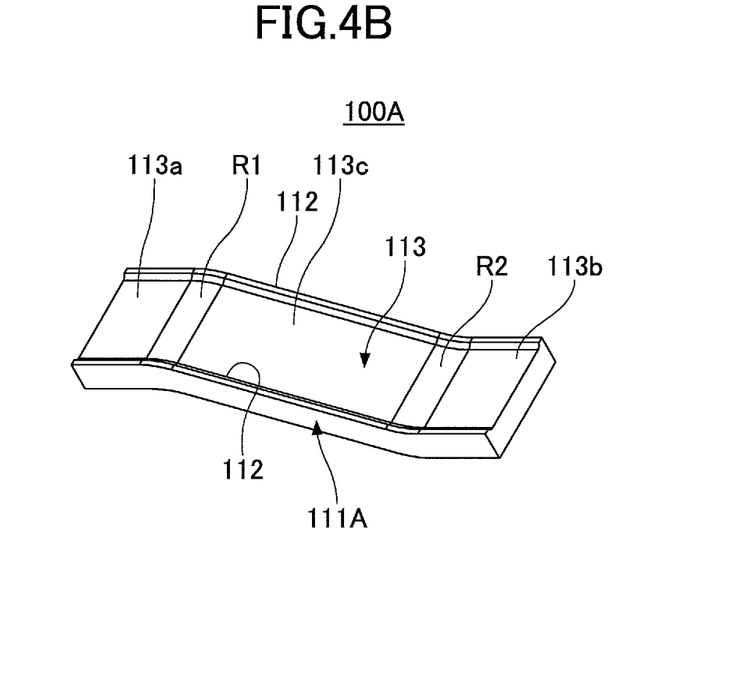
FIG. 4B is an enlarged perspective view of the guide according to the first embodiment.

FIG. 4A illustrates the guide 100A together with the lens ferrule 6, and FIG. 4B is an enlarged view of the guide 100A.

The guide 100A includes a guide body 111A that includes protrusions 112 and a guide groove 113. The protrusions 112 are formed on the sides of the guide groove 113, and protrude upward from a bottom surface of the guide groove 113 (or the upper surface of the guide body 111A). The protrusions 112 continuously extend in the longitudinal direction of the guide groove 113.

The guide groove 113 includes an upper groove 113a located at an upper position, a lower groove 113b located at a lower position, and an inclined groove 113c that connects the upper groove 113a and the lower groove 113b. The difference in height between the upper groove 113a and the lower groove 113b is made equal to the height ΔH of the step between the optical module 4 and the board 8.

A bent part R1 is formed between the upper groove 113a and the inclined groove 113c, and a bent part R2 is formed between the inclined groove 113c and the lower groove 113b.

A part of the waveguide 67 extending from the ferrule boot 63 is bonded to the guide groove 113. When the waveguide 67 is bonded to the guide groove 113, the protrusions 112 prevent misalignment of the waveguide 67 in the width direction. Thus, the protrusions 112 make it possible to easily provide the waveguide 67 to the guide groove 113 and prevent the waveguide 67 from being twisted. The protrusions 112 may be omitted when the waveguide 67 can be correctly positioned in the width direction without using the protrusions 112.

When the waveguide 67 is bonded to the guide groove 113, the shape of the waveguide 67 follows the shape of the guide groove 113. That is, the waveguide 67 is bent at the bent parts R1 and R2. The radii of curvature of the bent part R1 and the bent part R2 are set by adjusting the inclination angle of the inclined groove 113c such that the optical transmission efficiency of the bent waveguide 67 is not reduced.

The waveguide 67 is guided by the guide 100A, and the radii of curvature of the bent parts R1 and R2 are set such that the optical transmission efficiency of the waveguide 67 is not reduced. Accordingly, the guide 100A to guide the waveguide 67 can bridge the step between the optical module 4 and the board 8, and the optical transmission efficiency of the waveguide 67 is maintained at a high level.

The guide 100A may be comprised of a resin or a metal. When it is possible to install the waveguide 67 along the guide 100A by just placing the waveguide 67 on the guide 100A, the waveguide 67 may not necessarily be bonded to the guide 100A. In the present embodiment, the protrusions 112 are formed along the entire length of the guide groove 113. However, the protrusions 112 may be formed along only a part of the guide groove 113 as long as they can guide the waveguide 67.

Optical connectors according to other embodiments are described below with reference to FIGS. 5A through 12.

The same reference numbers as those in FIGS. 1 through 4B are assigned to the corresponding components in FIGS. 5A through 12, and repeated descriptions of those components are omitted.

Figure 5A:
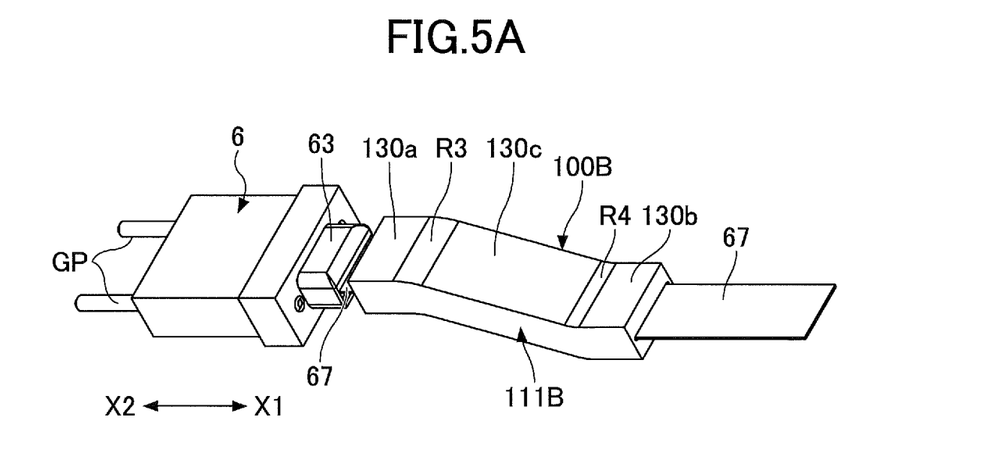
FIG. 5A is a perspective view of a lens ferrule and a guide according to a second embodiment.
Figure 5B:
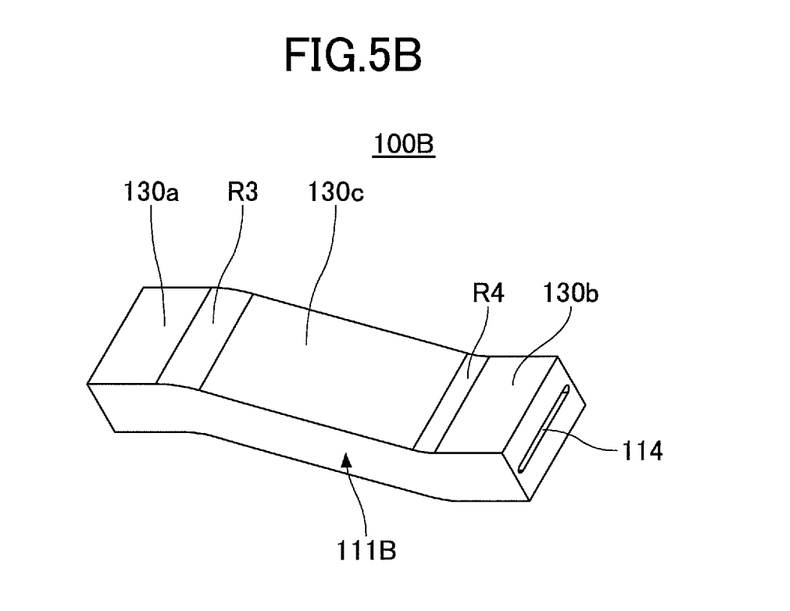
FIG. 5B is an enlarged perspective view of the guide according to the second embodiment.

FIGS. 5A and 5B illustrate a guide 100B of an optical connector according to a second embodiment. FIG. 5A illustrates the lens ferrule 6 and the guide 100B according to the second embodiment. FIG. 5B is an enlarged view of the waveguide guide 100B.

The waveguide guide 100B includes a guide body 111B in which an insertion hole 114 is formed. The guide body 111B is a rectangular substrate. The insertion hole 114 is formed to pass through the guide body 111B in the longitudinal direction. The guide body 111B has a Z-shape in side view. The waveguide guide 100B includes an upper part 130a, a lower part 130b, and an inclined part 130c that connects the upper part 130a and the lower part 130b. The difference in height between the upper part 130a and the lower part 130b is made equal to the height ΔH of the step between the optical module 4 and the board 8.

A bent part R3 is formed between the upper part 130a and the inclined part 130c, and a bent part R4 is formed between the inclined part 130c and the lower part 130b.

The waveguide 67 is inserted into the insertion hole 114 having a size that is sufficient for the waveguide 67 to pass through. Also, the insertion hole 114 may be formed in such a size that the waveguide 67 does not wrinkle when inserted into the insertion hole 114.

When the guide body 111B is formed as illustrated in FIG. 5, the insertion hole 114 is bent to match the shape of the guide body 111B. The radii of curvature of parts of the insertion hole 114 corresponding to the bent part R3 and the bent part R4 are set such that the optical transmission efficiency of the waveguide 67 is not reduced even when it is bent.

The waveguide 67 inserted into the insertion hole 114 and attached to the guide 100B is shaped according to the shape of the insertion hole 114, and the optical transmission efficiency of the waveguide 67 is not reduced at the bent parts R3 and R4.

Thus, the guide 100B to guide and bend the optical waveguide 67 can bridge the step between the optical module 4 and the board 8 with the bent waveguide 67, and the optical transmission efficiency of the waveguide 67 is maintained at a high level.

Figure 6A:
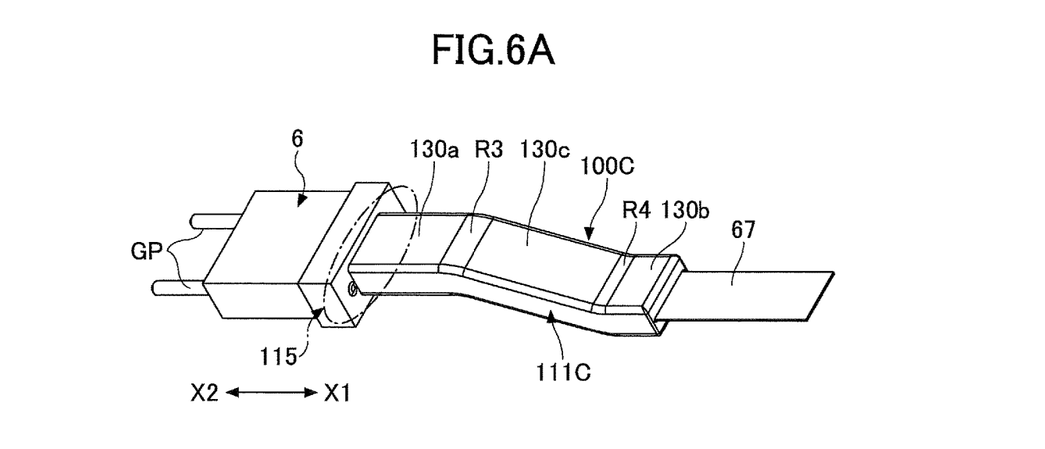
FIG. 6A is a perspective view of a lens ferrule and a guide according to a third embodiment.
Figure 6B:
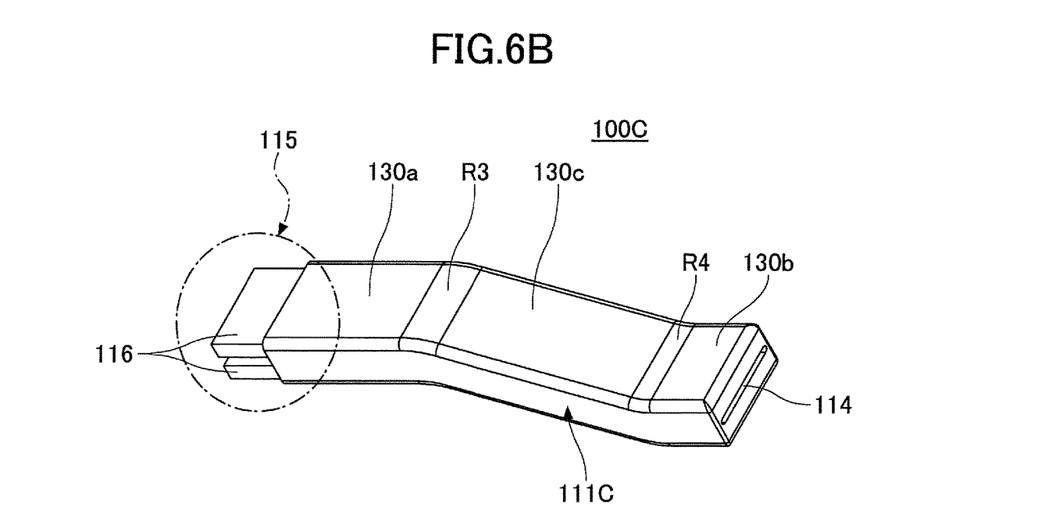
FIG. 6B is an enlarged perspective view of the guide according to the third embodiment.

FIGS. 6A and 6B illustrate a guide 100C of an optical connector according to a third embodiment. FIG. 6A illustrates the lens ferrule 6 and the guide 100C according to the third embodiment. FIG. 6B is an enlarged view of the guide 1000. The same reference numbers as those in FIGS. 5A and 5B are assigned to the corresponding components in FIGS. 6A and 6B.

The guide 100C includes a guide body 111C that includes a boot 115 as an integral part. The boot 115 is disposed at a cable side of the upper part 130a of the guide 100C. Also, the boot 115 includes extension parts 116 that are inserted into and fixed to the lens ferrule 6.

Also in the guide 100C, the difference in height between the upper part 130a and the lower part 130b is made equal to the height ΔH of the step between the optical module 4 and the board 8, and the radii of curvature of the bent part R3 and the bent part R4 are set such that the optical transmission efficiency of the waveguide 67 is not reduced.

The insertion hole 114 is formed to pass through the boot 115 and the guide body 111C. The radii of curvature of parts of the insertion hole 114 corresponding to the bent parts R3 and R4 are set such that the optical transmission efficiency of the waveguide 67 is not reduced. The insertion hole 114 is formed in such a size that the waveguide 67 can pass through, and the waveguide 67 does not wrinkle when inserted into the insertion hole 114.

The guide 100C to guide and bend the waveguide 67 can bridge the step between the optical module 4 and the board 8, and the optical transmission efficiency of the waveguide 67 is maintained at a high level.

The guide 100C includes the boot 115 that is integrally formed with the guide body 111C at the cable-side end. Because the boot 115 is directly attached to the lens ferrule 6, the waveguide 67 is completely covered and protected by the guide 100C at the module side, and the waveguide 67 can be protected across a long region extending from the module side.

The guide 100C may be formed of a rubber material which is a typical boot material. However, any other material may also be used as long as it can protect and guide the waveguide 67 in such a shape that the optical transmission efficiency is not reduced.

Figure 7A:
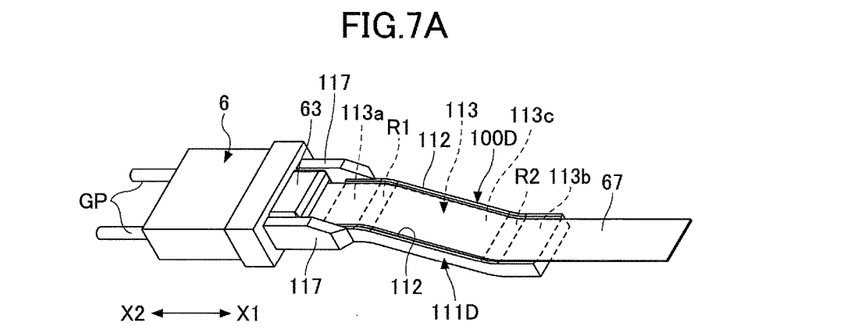
FIG. 7A is a perspective view of a lens ferrule and a guide according to a fourth embodiment.
Figure 7B:
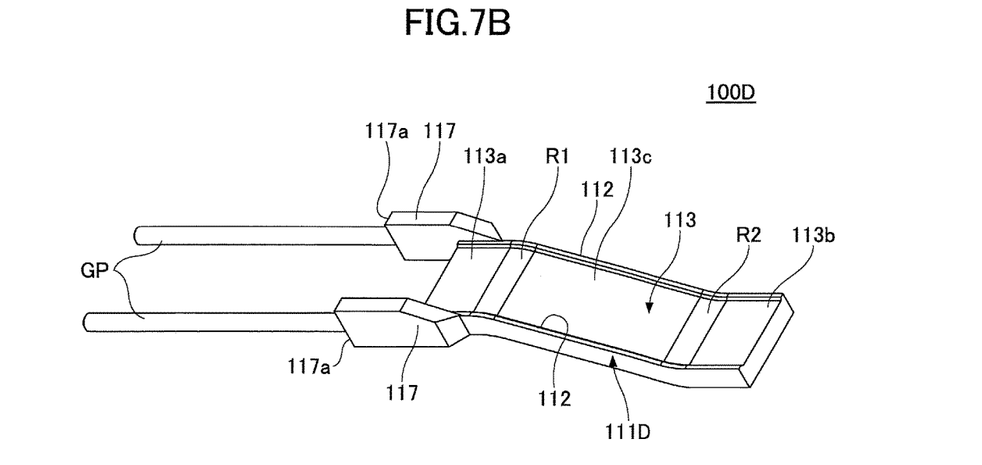
FIG. 7B is an enlarged perspective view of the guide according to the fourth embodiment.

FIGS. 7A and 7B illustrate a guide 100D of an optical connector according to a fourth embodiment. FIG. 7A illustrates the lens ferrule 6 and the guide 100D according to the fourth embodiment. FIG. 7B is an enlarged view of the guide 100D.

The guide 100D includes a guide body 111D, holders 117, and guide pins GP.

The guide body 111D includes a guide groove 113 including an upper groove 113a, a lower groove 113b, and an inclined groove 113c. The difference in height between the upper groove 113a and the lower groove 113b is made equal to the height ΔH of the step between the optical module 4 and the board 8.

The radii of curvature of a bent part R1 between the upper groove 113a and the inclined groove 113c and a bent part R2 between the inclined groove 113c and the lower groove 113b are set such that the optical transmission efficiency of the waveguide 67 is not reduced.

The holders 117 are disposed on the sides of the upper groove 113a. The guide pins GP are provided on end faces 117a of the holders 117, and inserted into holes formed in the MT ferrule 5 when the lens ferrule 6 is butted against the MT ferrule 5.

In the present embodiment, the guide body 111D, the holders 117, and the guide pins GP are formed as a monolithic part. However, the guide pins GP may be configured to be attachable to and detachable from the holders 117.

The guide 100D bridges the step between the optical module 4 and the board 8 with the bent waveguide 67 and maintains the optical transmission efficiency of the waveguide 67 at a high level.

Figure 8A:
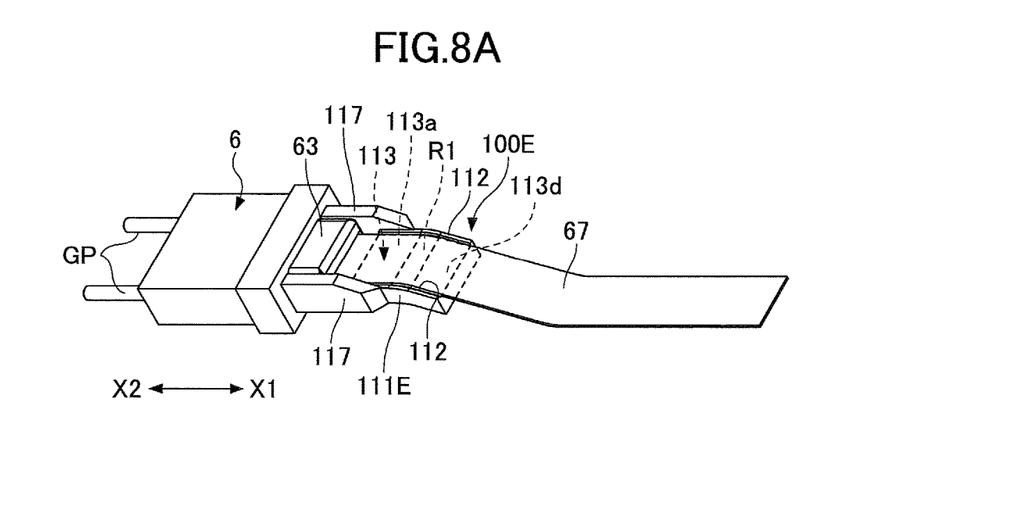
FIG. 8A is a perspective view of a lens ferrule and a guide according to a fifth embodiment.
Figure 8B:
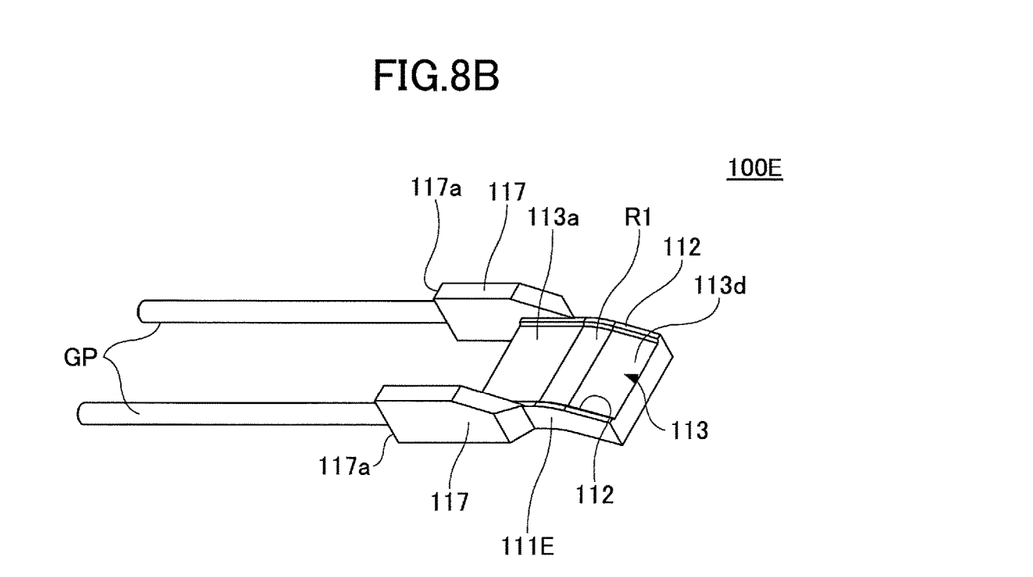
FIG. 8B is an enlarged perspective view of the guide according to the fifth embodiment.

FIGS. 8A and 8B illustrate a guide 100E of an optical connector according to a fifth embodiment. FIG. 8A illustrates the lens ferrule 6 and the guide 100E according to the fifth embodiment. FIG. 8B is an enlarged view of the guide 100E. The same reference numbers as those in FIGS. 7A and 7B are assigned to the corresponding components in FIGS. 8A and 8B.

The guide 100E has a configuration similar to that of the guide 100D of FIGS. 7A and 7B, except that the guide groove 113 is shorter than the guide groove 113 of the guide 100D. More specifically, in the guide 100E, the lower groove 113b is removed, and the length of an inclined groove 113d is about one fourth of the length of the inclined groove 113c illustrated in FIGS. 7A and 7B. Still, however, the radius of curvature of the bent part R1 between the upper groove 113a and the inclined groove 113d is set such that the optical transmission efficiency of the waveguide 67 is not reduced.

Thus, it is not always necessary to guide the entire waveguide 67 but only a part of the waveguide 67 may be guided to reduce a transmission loss. The guide 100E is configured to guide a part of the waveguide 67 likely to be bent, and can reduce a transmission loss. Also, the guide 100E can reduce the amount of material used and can therefore reduce costs.

A part of the waveguide 67 that is likely to be bent may be present in a position other than a position near the ferrule boot 63 depending on factors such as the position of the optical elements 81. In such a case, a guide may be provided locally for a part of the waveguide 67 that is likely to be bent.

Figure 9A:
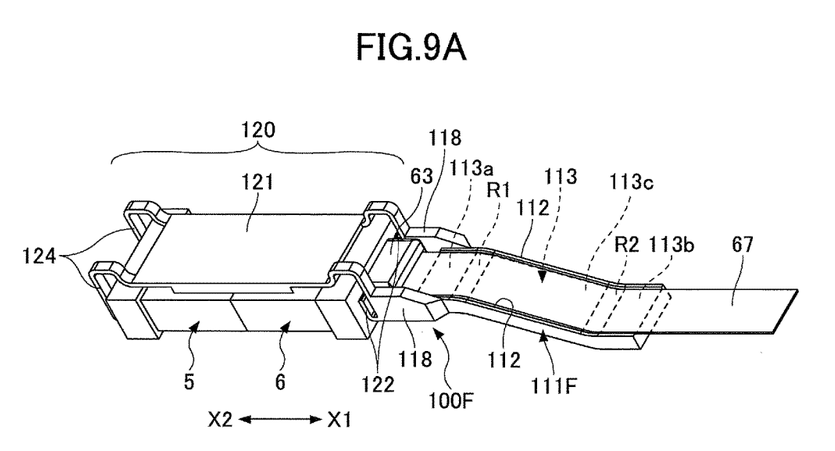
FIG. 9A is a perspective view of a lens ferrule and a guide according to a sixth embodiment.
Figure 9B:
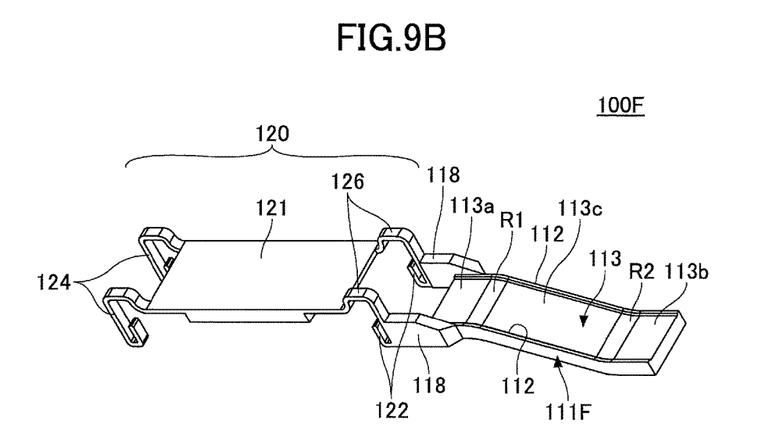
FIG. 9B is an enlarged perspective view of the guide according to the sixth embodiment.

FIGS. 9A and 9B illustrate a guide 100F of an optical connector according to a sixth embodiment. FIG. 9A illustrates the lens ferrule 6 and the guide 100F according to the fifth embodiment. FIG. 9B is an enlarged view of the guide 100F.

The guide 100F includes a guide body 111F, holders 118, and a clip 120.

The guide body 111F includes a guide groove 113 including an upper groove 113a, a lower groove 113b, and an inclined groove 113c. The difference in height between the upper groove 113a and the lower groove 113b is made equal to the height PH of the step between the optical module 4 and the board 8.

The radii of curvature of a bent part R1 between the upper groove 113a and the inclined groove 113c and a bent part R2 between the inclined groove 113c and the lower groove 113b are set such that the optical transmission efficiency of the waveguide 67 is not reduced.

The holders 118 are disposed on the sides of the cable-side part of the upper groove 113a. The clip 120 is joined to the holders 118.

In the present embodiment, the guide body 111F, the holders 118, and the clip 120 are formed as a monolithic part. However, the clip 120 may be configured to be attachable to and detachable from the holders 118.

The clip 120 has a function similar to the function of the clip 7 of the first embodiment.

The clip 120 includes arms 126 that are joined to the holders 118. The clip 120 also includes a base 121 and springs 122 and 124.

The base 121 is a rectangular, plate-shaped part. When the clip 120 is attached to the MT ferrule 5 and the lens ferrule 6, the base 121 is positioned to face the MT ferrule 5 and the lens ferrule 6.

The springs 122 formed on the holders 118 are disposed on the module side of the base 121. The springs 124 are formed at the cable-side end of the base 121.

When the clip 120 is attached to the MT ferrule 5 and the lens ferrule 6, the springs 122 engage with the lens ferrule 6, and the springs 124 engage with the MT ferrule 5. In this state, the elastic forces of the springs 122 and 124 are exerted in such directions that the MT ferrule 5 and the lens ferrule 6 are butted against each other.

The guide 100F can bridge the step between the optical module 4 and the board 8 with the bent waveguide as well as maintain the optical transmission efficiency of the waveguide 67 at a high level.

Figure 10A:
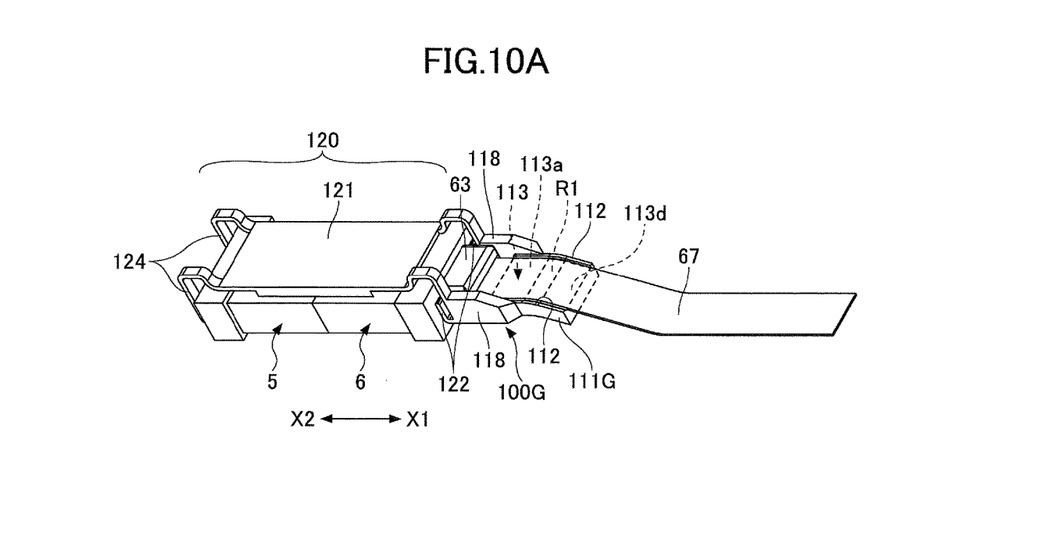
FIG. 10A is a perspective view of a lens ferrule and a guide according to a seventh embodiment.
Figure 10B:
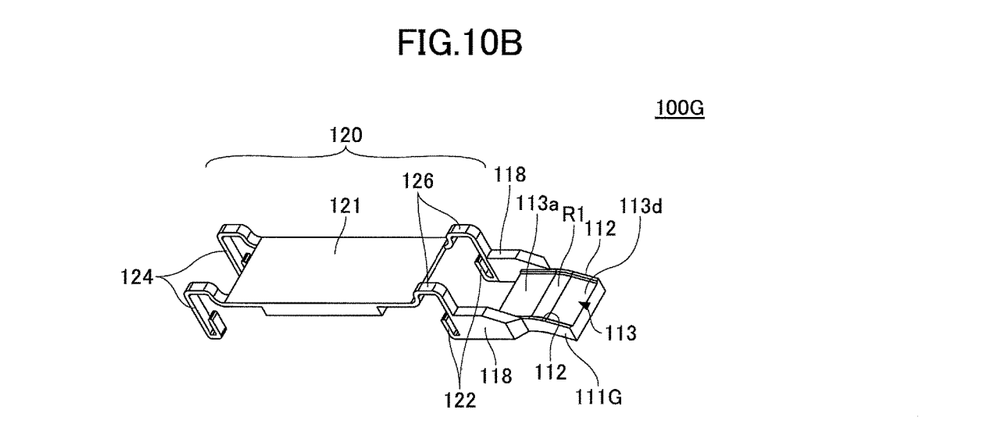
FIG. 10B is an enlarged perspective view of the guide according to the seventh embodiment.

FIGS. 10A and 10B illustrate a guide 100G of an optical connector according to a seventh embodiment. FIG. 10A illustrates the lens ferrule 10 and the guide 100G according to the seventh embodiment. FIG. 10B is an enlarged view of the guide 100G. The same reference numbers as those in FIGS. 8A through 9B are assigned to the corresponding components in FIGS. 10A and 10B.

The length of the inclined groove 113d of the guide 100G is about one fourth of the length of the inclined groove 113c of the guide 100F illustrated by FIGS. 9A and 9B. Still, however, the radius of curvature of the bent part R1 between the upper groove 113a and the inclined groove 113d is set such that the optical transmission efficiency of the waveguide 67 is not reduced.

Thus, only a part of the optical waveguide 67 that is likely to be bent may be guided to reduce a transmission loss. The guide 100G is configured to guide a part of the waveguide 67 likely to be bent, and can reduce a transmission loss. Also, the guide 100G can reduce the amount of material used and can therefore reduce costs.

Figure 11A:
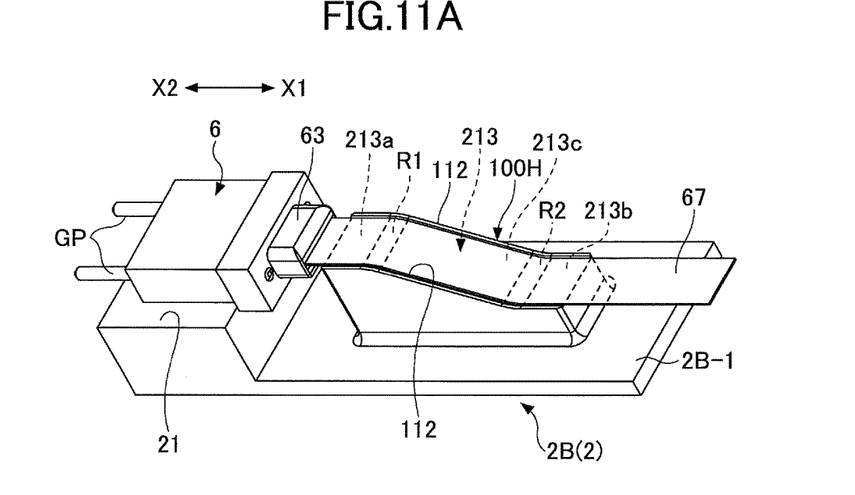
FIG. 11A is a perspective view of a lens ferrule and a guide according to an eighth embodiment.
Figure 11B:
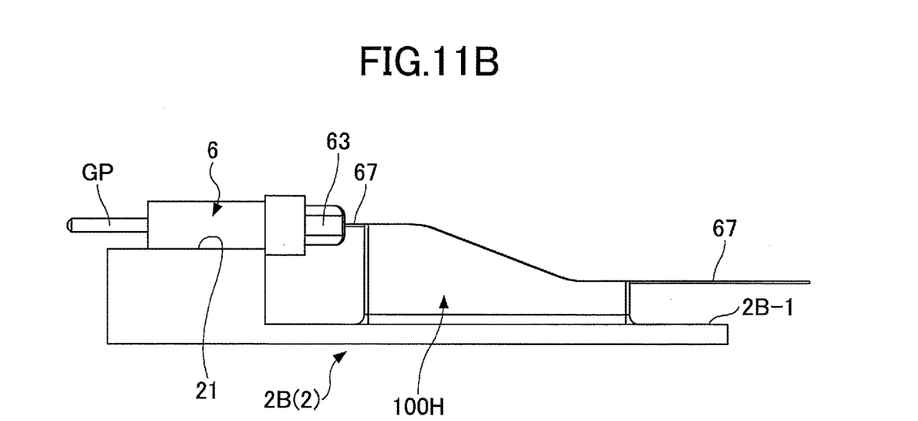
FIG. 11B is a side view of the lens ferrule and the guide according to the eighth embodiment.

FIGS. 11A and 11B illustrate a guide 100H of an optical connector according to an eighth embodiment. FIG. 11A is a perspective view and FIG. 11B is a side view of the lens ferrule 6 and the guide 100H according to the eighth embodiment. FIGS. 11A and 11B also include a part of the lower housing 2B.

The lower housing 2B includes the module attaching part 21. The lens ferrule 6 is attached to the upper surface of the module attaching part 21. Accordingly, the height of the lens ferrule 6 from an inner bottom surface 2B-1 of the lower housing 2B is determined by the module attaching part 21 of the lower housing 2B.

The guide 100H and the lower housing 2B are formed as a monolithic part. Protrusions 112 and a guide groove 213 are formed on the upper surface of the guide 100H.

The guide groove 213 includes an upper groove 213a, a lower groove 213b, and an inclined groove 213c that connects the upper groove 213a and the lower groove 213b. The difference in height between the upper groove 213a and the lower groove 213b is made equal to the height ΔH of the step between the optical module 4 and the board 8.

A bent part R1 is formed between the upper groove 213a and the inclined groove 213c, and a bent part R2 is formed between the inclined groove 213c and the lower groove 213b. The radii of curvature of the bent part R1 and the bent part R2 are set such that the optical transmission efficiency of the waveguide 67 is not reduced even when it is bent.

A part of the waveguide 67 is bonded to the guide groove 213. When the waveguide 67 is bonded to the guide groove 213, the shape of the waveguide 67 follows the shape of the guide groove 213.

The guide 100H can bridge the step between the optical module 4 and the board 8, and maintain the optical transmission efficiency of the waveguide 67 at a high level.

Also with the present embodiment, the module attaching part 21, the guide 100H, and the lower housing 2B are formed as a monolithic part by resin molding, and are therefore accurately aligned with each other.

Accordingly, the lens ferrule 6 and the waveguide 67 are accurately aligned with each other by attaching the lens ferrule 6 to the module attaching part 21 and attaching the waveguide 67 to the guide 100H. This in turn eliminates the need to perform positioning of the lens ferrule 6 and the waveguide 67 separately, and makes it easier to assemble the connector 1.

Also with the present embodiment, because the lens ferrule 6 and the waveguide 67 are accurately aligned with each other, the waveguide 67 is prevented from being bent at a position between the lens ferrule 6 and the guide 100H, and reduction in the optical transmission efficiency of the waveguide 67 is also prevented.

Figure 12:
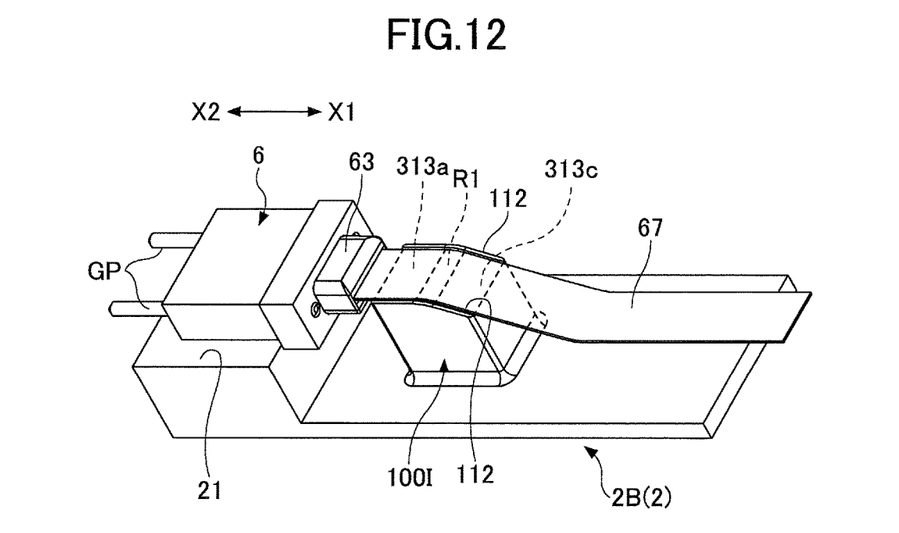
FIG. 12 is a perspective view of a lens ferrule and a guide according to a ninth embodiment.

FIG. 12 illustrates a guide 100I of an optical connector according to a ninth embodiment. FIG. 12 also includes a part of the lower housing 2B.

The lens ferrule 6 is attached to the upper surface of the module attaching part 21. Accordingly, the height of the lens ferrule 6 from the inner bottom surface 2B-1 of the lower housing 2B is determined by the module attaching part 21.

Protrusions 112 and a guide groove 313 are formed on the upper surface of the guide 100I. The guide groove 313 includes an upper groove 313a and an inclined groove 313c that extends obliquely downward from the upper groove 313a toward the module side. A bent part R1 is formed between the upper groove 313a and the inclined groove 313c. The radius of curvature of the bent part R1 is set such that the optical transmission efficiency of the waveguide 67 is not reduced even when it is bent.

A part of the waveguide 67 is bonded to the guide groove 313. When the waveguide 67 is bonded to the guide groove 313, the shape of the waveguide 67 follows the shape of the guide groove 313. Accordingly, the guide 100I can bridge the step between the optical module 4 and the board 8 with the optical waveguide 67 while maintaining the optical transmission efficiency of the waveguide 67 at a high level.

In the embodiment, the guide 100I is aligned with the lower housing 2B by attaching the guide 100I to the lower housing 2B. Also, the module attaching part 21 is accurately formed as a part of the lower housing 2B.

Accordingly, the lens ferrule 6 and the waveguide 67 are accurately aligned with each other by attaching the lens ferrule 6 to the module attaching part 21 and attaching the waveguide 67 to the guide 100I.

This in turn eliminates the need to perform positioning of the lens ferrule 6 and the waveguide 67 separately, and makes it easier to assemble the connector 1.

Also with the present embodiment, the waveguide 67 is prevented from being bent at a position between the lens ferrule 6 and the guide 100I as the lens ferrule 6 and the waveguide 67 are accurately aligned with each other, and reduction in the optical transmission efficiency can also be prevented.

Optical connectors and optical waveguide guides according to the embodiments of the present invention are described above. However, the present invention is not limited to the specifically disclosed embodiments, and variations and modifications may be made without departing from the scope of the present invention.

In the embodiment of FIGS. 7A through 10B, the waveguide 67 is attached to and guided by the guide groove 113 formed on the guides 100D through 100G. However, a guide with the guide pins GP or the clip 120 may have an insertion hole 114 formed in a substrate to insert and guide the waveguide 67.

An aspect of this disclosure can provide an optical connector configured to prevent an optical waveguide from being excessively bent or twisted.

What is claimed is:

1. An optical connector, comprising:
   a housing;
   a ferrule attached to the housing, an optical waveguide being connected to the ferrule; and
   a guide that guides the optical waveguide, the guide being housed in the housing and protruding from an inner bottom surface of the housing in a direction perpendicular to the inner bottom surface, wherein
   the guide includes an upper part, an inclined part, and a first bent part connecting the upper part and the inclined part; and
   a height of the upper part of the guide is equal to a distance in height between a part of the optical waveguide coming out from the ferrule and the inner bottom surface of the housing.

2. The optical connector as claimed in claim 1, wherein the guide further includes a lower part and a second bent part connecting the inclined part and the lower part.

3. The optical connector as claimed in claim 1, wherein
   the housing includes an attaching part to which the ferrule is attached; and
   a step is formed between the attaching part and the inner bottom surface.

4. The optical connector as claimed in claim 1, wherein the housing and the guide are formed as a monolithic part.

5. An optical connector, comprising:
   a ferrule;
   an optical waveguide extending from the ferrule;
   a guide that is attached to the ferrule and guides the optical waveguide; and
   a guide pin connected to the guide, wherein
   the guide includes an upper part, an inclined part, and a bent part connecting the upper part and the inclined part; and
   the ferrule includes a hole into which the guide pin is inserted.

6. The optical connector as claimed in claim 5, wherein the guide and the guide pin are formed as a monolithic part.

7. An optical connector, comprising:
   a first ferrule;
   a second ferrule;
   an optical waveguide extending from the second ferrule;
   a guide that guides the optical waveguide, and includes an upper part, an inclined part, and a bent part connecting the upper part and the inclined part; and
   a clip that pinches the first ferrule and the second ferrule together,
   wherein the guide is attached to the clip.

* * * * *